(12) United States Patent
Mitani et al.

(10) Patent No.: US 11,942,817 B2
(45) Date of Patent: Mar. 26, 2024

(54) POWER SUPPLY CIRCUIT

(71) Applicant: HONDA MOTOR CO., LTD., Tokyo (JP)

(72) Inventors: Manabu Mitani, Wako (JP); Sadao Shinohara, Wako (JP); Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 17/592,551

(22) Filed: Feb. 4, 2022

(65) Prior Publication Data

US 2022/0271560 A1  Aug. 25, 2022

(30) Foreign Application Priority Data

Feb. 22, 2021 (JP) ................. 2021-026201

(51) Int. Cl.
 *H02J 9/06* (2006.01)
 *G06F 1/28* (2006.01)
(52) U.S. Cl.
 CPC ............... *H02J 9/062* (2013.01); *G06F 1/28* (2013.01); *H02J 9/061* (2013.01)

(58) Field of Classification Search
 CPC .............. H02J 9/062; H02J 9/061; G06F 1/28
 USPC .................................................. 307/46, 10.1
 See application file for complete search history.

(56) References Cited

U.S. PATENT DOCUMENTS

2017/0310142 A1* 10/2017 Watanabe ............. H02J 7/1438
2019/0337403 A1* 11/2019 Tanaka ............. H01M 8/04303

FOREIGN PATENT DOCUMENTS

JP         2014-182679        9/2014

* cited by examiner

*Primary Examiner* — Michael R. Fin
(74) *Attorney, Agent, or Firm* — Amin, Turocy & Watson, LLP

(57) ABSTRACT

A power supply circuit includes PCU switches provided in respective positive wires of a first power source conduction path and a second power source conduction path which connect a first generator respectively to a first power transmission bus and a second power transmission bus, and further includes power transmission bus switches provided in respective negative wires of a first load conduction path and a second load conduction path which connect respectively the first power transmission bus and the second power transmission bus to a first load.

9 Claims, 8 Drawing Sheets

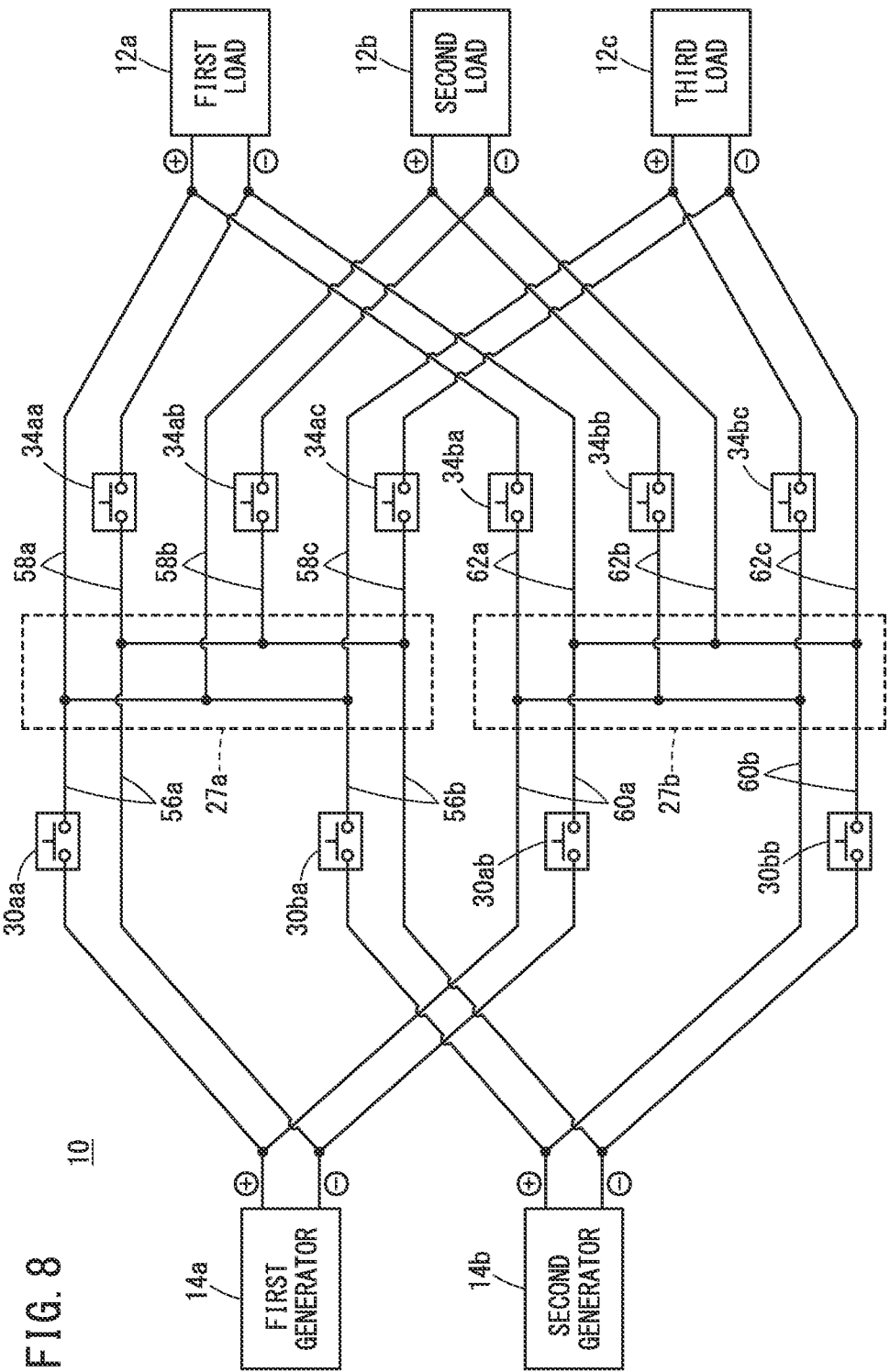

POWER SUPPLY CIRCUIT

CROSS-REFERENCE TO RELATED APPLICATIONS

This application is based upon and claims the benefit of priority from Japanese Patent Application No. 2021-026201 filed on Feb. 22, 2021, the contents of which are incorporated herein by reference.

BACKGROUND OF THE INVENTION

Field of the Invention

The present invention relates to a power supply circuit having a plurality of power transmission buses.

Description of the Related Art

JP 2014-182679 A discloses a power supply circuit. The power supply circuit includes a plurality of power sources, a plurality of loads, and a plurality of power supply buses. The plurality of power sources are connected to each of the plurality of power supply buses. The plurality of loads are connected to each of the plurality of power supply buses. A protection circuit is provided between each power supply bus and each power source. A protection circuit is provided between each power supply bus and each load.

SUMMARY OF THE INVENTION

In the power supply circuit disclosed in JP 2014-182679 A, there is a problem that the weight of the power supply circuit becomes heavy.

The present invention has been made to solve the above-described problem, and an object thereof is to provide a power supply circuit which is light in weight.

According to an aspect of the present invention, there is provided a power supply circuit including: a first power source conduction path provided between a power source and a first power transmission bus; a first load conduction path provided between the first power transmission bus and a load; a second power source conduction path provided between the power source and a second power transmission bus; and a second load conduction path provided between the second power transmission bus and the load; wherein the power supply circuit further includes: a first positive electrode switch provided in a positive wire of one of the first power source conduction path or the first load conduction path, the first positive electrode switch being configured to switch between an electrically connected state and an electrically disconnected state of the power source and the first power transmission bus or of the first power transmission bus and the load; a first negative electrode switch provided in a negative wire of another of the first power source conduction path or the first load conduction path, the first negative electrode switch being configured to switch between an electrically connected state and an electrically disconnected state of the power source and the first power transmission bus or of the first power transmission bus and the load; a second positive electrode switch provided in a positive wire of one of the second power source conduction path or the second load conduction path, the second positive electrode switch being configured to switch between an electrically connected state and an electrically disconnected state of the power source and the second power transmission bus or of the second power transmission bus and the load; and a second negative electrode switch provided in a negative wire of another of the second power source conduction path or the second load conduction path, the second negative electrode switch being configured to switch between an electrically connected state and an electrically disconnected state of the power source and the second power transmission bus or of the second power transmission bus and the load.

According to the present invention, the weight of the power supply circuit can be reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a diagram schematically showing a connection configuration of the power supply circuit.

DESCRIPTION OF THE INVENTION

First Embodiment

Figure 1:
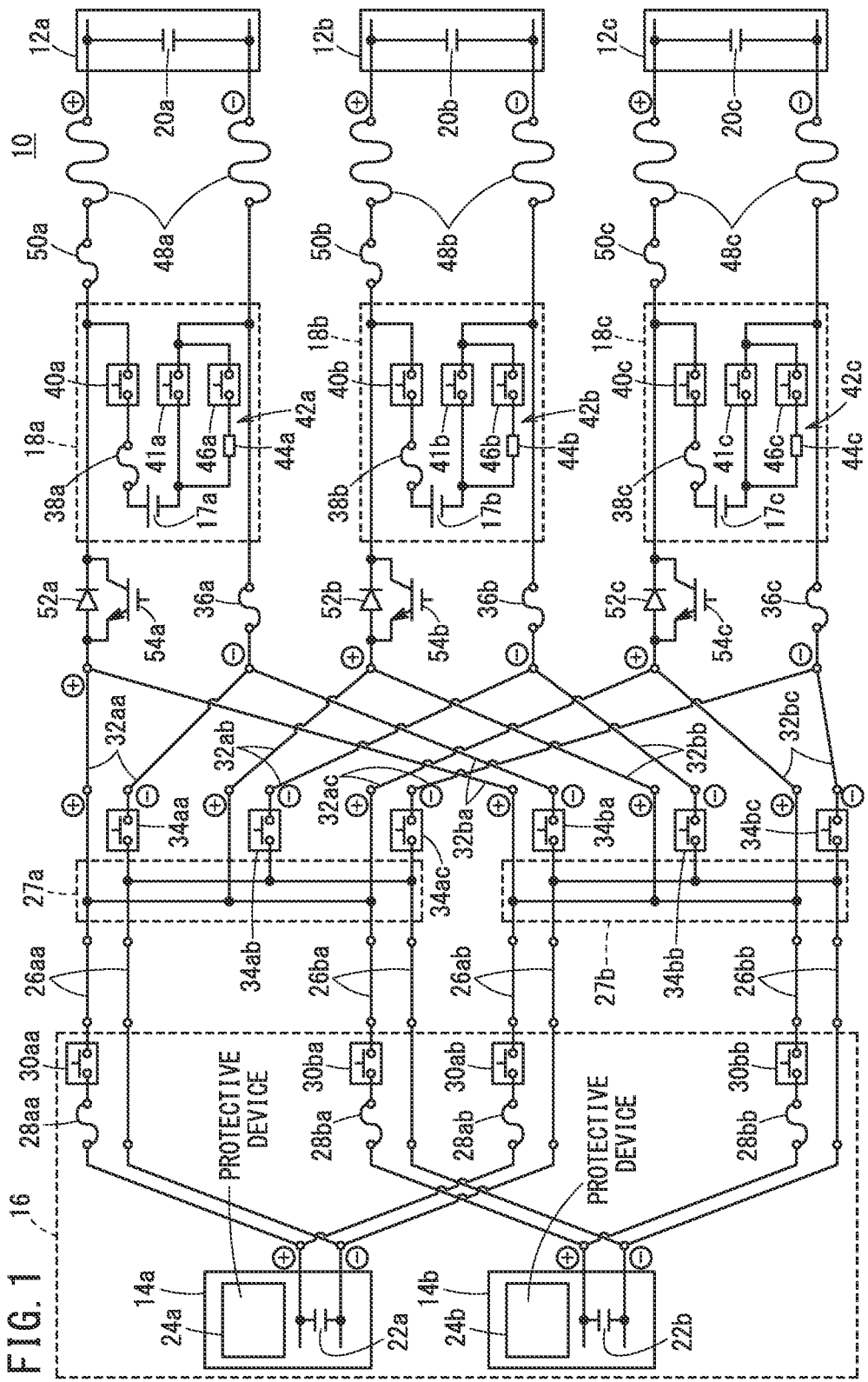
FIG. 1 is a circuit diagram of a power supply circuit.

FIG. 1 is a circuit diagram of a power supply circuit 10 according to the present embodiment. The power supply circuit 10 supplies power to three loads, i.e., a first load 12a, a second load 12b, and a third load 12c. The power supply circuit 10 includes a power control unit 16, a first intelligent power unit 18a, a second intelligent power unit 18b, and a third intelligent power unit 18c. Hereinafter, the power control unit may be referred to as a PCU. Hereinafter, the intelligent power unit may be referred to as an IPU.

The PCU 16 includes a first generator 14a and a second generator 14b as power sources. The first generator 14a has a capacitor 22a therein. The second generator 14b has a capacitor 22a therein. The first generator 14a has a protective device 24a. The second generator 14b has a protective device 24b. The protective device 24a monitors a current output from the first generator 14a. When overcurrent is detected, the protective device 24a stops operation of the first generator 14a. The protective device 24b monitors a current output from the second generator 14b. When overcurrent is detected, the protective device 24b stops operation of the second generator 14b.

The first IPU 18a includes a first battery 17a as a power source. The second IPU 18b includes a second battery 17b as a power source. The third IPU 18c includes a third battery 17c as a power source.

The first load 12a has a capacitor 20a therein. The second load 12b has a capacitor 20b therein. The third load 12c has a capacitor 20c therein.

The first generator 14a is connected to a first power transmission bus 27a by a PCU bus bar 26aa. The first generator 14a is connected to a second power transmission bus 27b by a PCU bus bar 26ab. The second generator 14b is connected to the first power transmission bus 27a by a PCU bus bar 26ba. The second generator 14b is connected to the second power transmission bus 27b by a PCU bus bar 26bb. The PCU bus bars 26aa, 26ab, 26ba, 26bb may be multiplexed.

The first power transmission bus 27a connects the first generator 14a and the second generator 14b in parallel. The second power transmission bus 27b connects the first generator 14a and the second generator 14b in parallel.

A PCU fuse 28aa and a PCU switch 30aa are provided between the positive terminal of the first generator 14a and the PCU bus bar 26aa. The PCU fuse 28aa and the PCU switch 30aa are connected in series. A PCU fuse 28ab and a PCU switch 30ab are provided between the positive terminal of the first generator 14a and the PCU bus bar 26ab. The PCU fuse 28ab and the PCU switch 30ab are connected in series. A PCU fuse 28ba and a PCU switch 30ba are provided between the positive terminal of the second generator 14b and the PCU bus bar 26ba. The PCU fuse 28ba and the PCU switch 30ba are connected in series. A PCU fuse 28bb and a PCU switch 30bb are provided between the positive terminal of the second generator 14b and the PCU bus bar 26bb. The PCU fuse 28bb and the PCU switch 30bb are connected in series. The PCU switch 30aa and the PCU switch 30ba correspond to a first positive electrode switch of the present invention. The PCU switch 30ab and the PCU switch 30bb correspond to a second positive electrode switch of the present invention.

When the PCU switch 30aa is ON, the first generator 14a is electrically connected to the first power transmission bus 27a. When the PCU switch 30ba is ON, the second generator 14b is electrically connected to the first power transmission bus 27a. When the PCU switch 30aa is OFF, the first generator 14a is electrically disconnected from the first power transmission bus 27a. When the PCU switch 30ba is OFF, the second generator 14b is electrically disconnected from the first power transmission bus 27a.

When the PCU switch 30ab is ON, the first generator 14a is electrically connected to the second power transmission bus 27b. When the PCU switch 30bb is ON, the second generator 14b is electrically connected to the second power transmission bus 27b. When the PCU switch 30ab is OFF, the first generator 14a is electrically disconnected from the second power transmission bus 27b. When the PCU switch 30bb is OFF, the second generator 14b is electrically disconnected from the second power transmission bus 27b.

There is no particular limitation on the method of switching each of the PCU switches 30aa, 30ab, 30ba, and 30bb between ON and OFF. For example, these switches may be switched by an electrical signal. Alternatively, these switches may be manually switched. These switches may be switched by physical actions such as heat and pressure. These switches may also be switched by chemical action.

The first IPU 18a is connected to the first power transmission bus 27a by an IPU bus bar 32aa. The second IPU 18b is connected to the first power transmission bus 27a by an IPU bus bar 32ab. The third IPU 18c is connected to the first power transmission bus 27a by the IPU bus bar 32ac. The first IPU 18a is connected to the second power transmission bus 27b by an IPU bus bar 32ba. The second IPU 18b is connected to the second power transmission bus 27b by an IPU bus bar 32bb. The third IPU 18c is connected to the second power transmission bus 27b by an IPU bus bar 32bc. The IPU bus bar 32aa, the IPU bus bar 32ab, the IPU bus bar 32ac, the IPU bus bar 32ba, the IPU bus bar 32bb and the IPU bus bar 32bc may be multiplexed.

A power transmission bus switch 34aa is provided between the negative wire of the first power transmission bus 27a and the IPU bus bar 32aa. A power transmission bus switch 34ab is provided between the negative wire of the first power transmission bus 27a and the IPU bus bar 32ab. A power transmission bus switch 34ac is provided between the negative wire of the first power transmission bus 27a and the IPU bus bar 32ac. A power transmission bus switch 34ba is provided between the negative wire of the second power transmission bus 27b and the IPU bus bar 32ba. A power transmission bus switch 34bb is provided between the negative wire of the second power transmission bus 27b and the IPU bus bar 32bb. A power transmission bus switch 34bc is provided between the negative wire of the second power transmission bus 27b and the IPU bus bar 32bc. The power transmission bus switch 34aa, power transmission bus switch 34ab, and power transmission bus switch 34ac correspond to a first negative electrode switch of the present invention. The power transmission bus switch 34ba, the power transmission bus switch 34bb, and the power transmission bus switch 34bc correspond to a second negative electrode switch of the present invention.

When the power transmission bus switch 34aa is ON, the first load 12a is electrically connected to the first power transmission bus 27a. When the power transmission bus switch 34ab is ON, the second load 12b is electrically connected to the first power transmission bus 27a. When the power transmission bus switch 34ac is ON, the third load 12c is electrically connected to the first power transmission bus 27a. On the other hand, when the power transmission bus switch 34aa is OFF, the first load 12a is electrically disconnected from the first power transmission bus 27a. When the power transmission bus switch 34ab is OFF, the second load 12b is electrically disconnected from the first power transmission bus 27a. When the power transmission bus switch 34ac is OFF, the third load 12c is electrically disconnected from the first power transmission bus 27a.

When the power transmission bus switch 34ba is ON, the first load 12a is electrically connected to the second power transmission bus 27b. When the power transmission bus switch 34bb is ON, the second load 12b is electrically connected to the second power transmission bus 27b. When the power transmission bus switch 34bc is ON, the third load 12c is electrically connected to the second power transmission bus 27b. On the other hand, when the power transmission bus switch 34ba is OFF, the first load 12a is electrically disconnected from the second power transmission bus 27b. When the power transmission bus switch 34bb is OFF, the second load 12b is electrically disconnected from the second power transmission bus 27b. When the power transmission bus switch 34bc is OFF, the third load 12c is electrically disconnected from the second power transmission bus 27b.

The operation method for switching each of the power transmission bus switches 34aa, 34ab, 34ac, 34ba, 34bb, and 34bc between ON and OFF is not particularly limited. For example, these switches may be switched by an electrical signal. Alternatively, these switches may be manually switched. These switches may be switched by physical actions such as heat and pressure. These switches may also be switched by chemical action.

The first IPU 18a is connected to the negative wire of the IPU bus bar 32aa and the negative wire of the IPU bus bar 32ba via an IPU fuse 36a. The second IPU 18b is connected to the negative wire of the IPU bus bar 32ab and the negative wire of the IPU bus bar 32*bb* via an IPU fuse 36*b*. The third IPU 18*c* is connected to the negative wire of the IPU bus bar 32*ac* and the negative wire of the IPU bus bar 32*bc* via an IPU fuse 36*c*.

The first battery 17*a* is provided in parallel with the first generator 14*a* and the second generator 14*b*. The second battery 17*b* is provided in parallel with the first generator 14*a* and the second generator 14*b*. The third battery 17*c* is provided in parallel with the first generator 14*a* and the second generator 14*b*.

A battery fuse 38*a* and a battery switch 40*a* are connected to the positive terminal of the first battery 17*a*. The battery fuse 38*a* and the battery switch 40*a* are connected in series. A battery fuse 38*b* and a battery switch 40*b* are connected to the positive terminal of the second battery 17*b*. The battery fuse 38*b* and the battery switch 40*b* are connected in series. A battery fuse 38*c* and a battery switch 40*c* are connected to the positive terminal of the third battery 17*c*. The battery fuse 38*c* and the battery switch 40*c* are connected in series.

A battery switch 41*a* is connected to the negative terminal of the first battery 17*a*. A battery switch 41*b* is connected to the negative terminal of the second battery 17*b*. A battery switch 41*c* is connected to the negative terminal of the third battery 17*c*.

A precharge circuit 42*a* is connected in parallel with the battery switch 41*a*. The precharge circuit 42*a* includes a resistor 44*a* and a precharge switch 46*a*. The resistor 44*a* and the precharge switch 46*a* are connected in series. A precharge circuit 42*b* is connected in parallel with the battery switch 41*b*. The precharge circuit 42*b* includes a resistor 44*b* and a precharge switch 46*b*. The resistor 44*b* and the precharge switch 46*b* are connected in series. A precharge circuit 42*c* is connected in parallel with the battery switch 41*c*. The precharge circuit 42*c* includes a resistor 44*c* and a precharge switch 46*c*. The resistor 44*c* and the precharge switch 46*c* are connected in series.

When power is supplied from the first battery 17*a* to the first load 12*a*, the power supply circuit 10 turns on the battery switch 40*a* and the battery switch 41*a*. At this time, the power supply circuit 10 turns off the precharge switch 46*a*. When power is supplied from the second battery 17*b* to the second load 12*b*, the power supply circuit 10 turns on the battery switch 40*b* and the battery switch 41*b*. At this time, the power supply circuit 10 turns off the precharge switch 46*b*. When power is supplied from the third battery 17*c* to the third load 12*c*, the power supply circuit 10 turns on the battery switch 40*c* and the battery switch 41*c*. At this time, the power supply circuit 10 turns off the precharge switch 46*c*.

When charging the capacitor 20*a* inside the first load 12*a*, the power supply circuit 10 turns on the battery switch 40*a* and the precharge switch 46*a*. At this time, the power supply circuit 10 turns off the battery switch 41*a*. When charging the capacitor 20*b* inside the second load 12*b*, the power supply circuit 10 turns on the battery switch 40*b* and the precharge switch 46*b*. At this time, the power supply circuit 10 turns off the battery switch 41*b*. When charging the capacitor 20*c* inside the third load 12*c*, the power supply circuit 10 turns on the battery switch 40*c* and the precharge switch 46*c*. At this time, the power supply circuit 10 turns off the battery switch 41*c*.

The operation method for switching each of the battery switches 40*a*, 40*b*, 40*c*, 41*a*, 41*b*, 41*c*, and the precharge switches 46*a*, 46*b*, 46*c* between ON and OFF is not particularly limited. For example, these switches may be switched by an electrical signal. Alternatively, these switches may be manually switched. These switches may be switched by physical actions such as heat and pressure. These switches may also be switched by chemical action.

The first load 12*a* is connected to the first IPU 18*a* by a load cable 48*a*. A load fuse 50*a* is provided between the first IPU 18*a* and the positive wire of the load cable 48*a*. The second load 12*b* is connected to the second IPU 18*b* by a load cable 48*b*. A load fuse 50*b* is provided between the second IPU 18*b* and the positive wire of the load cable 48*b*. The third load 12*c* is connected to the third IPU 18*c* by a load cable 48*c*. A load fuse 50*c* is provided between the third IPU 18*c* and the positive wire of the load cable 48*c*.

The first generator 14*a* and the second generator 14*b* supply power to the first load 12*a* via the load cable 48*a*. The first generator 14*a* and the second generator 14*b* supply power to the second load 12*b* via the load cable 48*b*. The first generator 14*a* and the second generator 14*b* supply power to the third load 12*c* via the load cable 48*c*. The load cable 48*a*, load cable 48*b*, and load cable 48*c* may be multiplexed.

The first IPU 18*a* is connected via a diode 52*a* to the positive wire of the IPU bus bar 32*aa* and the positive wire of the IPU bus bar 32*ba*. The diode 52*a* allows the flow of current from the first generator 14*a* toward the load cable 48*a* and also allows the flow of current from the second generator 14*b* toward the load cable 48*a*. On the other hand, the diode 52*a* does not allow the flow of current from the load cable 48*a* toward the first generator 14*a* and also does not allow the flow of current from the load cable 48*a* to the second generator 14*b*.

The second IPU 18*b* is connected to the positive wire of the IPU bus bar 32*ab* and the positive wire of the IPU bus bar 32*bb* through a diode 52*b*. The diode 52*b* allows electric current to flow from the first generator 14*a* toward the load cable 48*b*, and also allows electric current to flow from the second generator 14*b* toward the load cable 48*b*. On the other hand, the diode 52*b* does not allow the current to flow from the load cable 48*b* to the first generator 14*a* and also does not allow the current to flow from the load cable 48*b* to the second generator 14*b*.

The third IPU 18*c* is connected to the positive wire of the IPU bus bar 32*ac* and the positive wire of the IPU bus bar 32*bc* through a diode 52*c*. The diode 52*c* allows electric current to flow from the first generator 14*a* toward the load cable 48*c* and also allows the current to flow from the second generator 14*b* toward the load cable 48*c*. On the other hand, the diode 52*c* does not allow the flow of current from the load cable 48*c* to the first generator 14*a* and also does not allow the flow of current from the load cable 48*c* to the second generator 14*b*.

A transistor 54*a* is connected in parallel with the diode 52*a*. When the transistor 54*a* is ON, the first generator 14*a* and the second generator 14*b* are electrically connected to the load cable 48*a* through the transistor 54*a*. When the transistor 54*a* is OFF, the first generator 14*a* and the second generator 14*b* are electrically connected to the load cable 48*a* through the diode 52*a*.

A transistor 54*b* is connected in parallel with the diode 52*b*. When the transistor 54*b* is ON, the first generator 14*a* and the second generator 14*b* are electrically connected to the load cable 48*b* via the transistor 54*b*. When the transistor 54*b* is OFF, the first generator 14*a* and the second generator 14*b* are electrically connected to the load cable 48*b* via the diode 52*b*.

A transistor 54*c* is connected in parallel with the diode 52*c*. When the transistor 54*c* is ON, the first generator 14*a* and the second generator 14*b* are electrically connected to the load cable 48*c* via the transistor 54*c*. When the transistor 54c is OFF, the first generator 14a and the second generator 14b are electrically connected to the load cable 48c via the diode 52c.

Switching of the transistors 54a, 54b, and 54c between ON and OFF is controlled by a base current or a gate voltage.

A precharge circuit may be provided in parallel with the transistor 54a. When the capacitor 22a inside the first generator 14a and the capacitor 22b inside the second generator 14b are charged by electric power of the first battery 17a, electric power is supplied to the capacitor 22a and the capacitor 22b through the precharge circuit. A precharge circuit may be provided in parallel with the transistor 54b. When the capacitor 22a inside the first generator 14a and the capacitor 22b inside the second generator 14b are charged by electric power of the second battery 17b, electric power is supplied to the capacitor 22a and the capacitor 22b through the precharge circuit. A precharge circuit may be provided in parallel with the transistor 54c. When the capacitor 22a inside the first generator 14a and the capacitor 22b inside the second generator 14b are charged by electric power of the third battery 17c, electric power is supplied to the capacitor 22a and the capacitor 22b through the precharge circuit. As a result, an inrush current can be prevented from occurring when the capacitors 22a and 22b are charged.

In the above, the power supply circuit 10 having the PCU 16 with two generators has been described. That is, the power supply circuit 10 having the PCU 16 including the first generator 14a and the second generator 14b has been described above. However, the PCU 16 may have one generator. The PCU 16 may include three or more generators.

In the above, the power supply circuit 10 having three IPUs has been described. That is, the power supply circuit 10 having the first IPU 18a, the second IPU 18b, and the third IPU 18c has been described above. However, the power supply circuit 10 may have one or more IPUs.

A large-capacity capacitor may be used in place of the first battery 17a, the second battery 17b, and the third battery 17c.

The power supply circuit 10 includes an arithmetic unit and a judgment unit (not shown), and the power supply circuit 10 controls each switch in addition to the transistors 54a, 54b, and 54c. The arithmetic unit and the judgment unit can be realized by, for example, a processing circuitry.

The processing circuitry is constituted by an integrated circuit such as an ASIC (Application Specific Integrated Circuit) or an FPGA (Field-Programmable Gate Array). Further, the processing circuitry may be constituted by an electronic circuit including a discrete device.

The processing circuitry may be composed of a processor such as a CPU (Central Processing Unit) or a GPU (Graphics Processing Unit), for example. In this case, the processing circuitry can be realized by the processor executing a program stored in a storage unit (not shown).

[Configuration of PCU Switches and Power Transmission Bus Switches]

Figure 2:
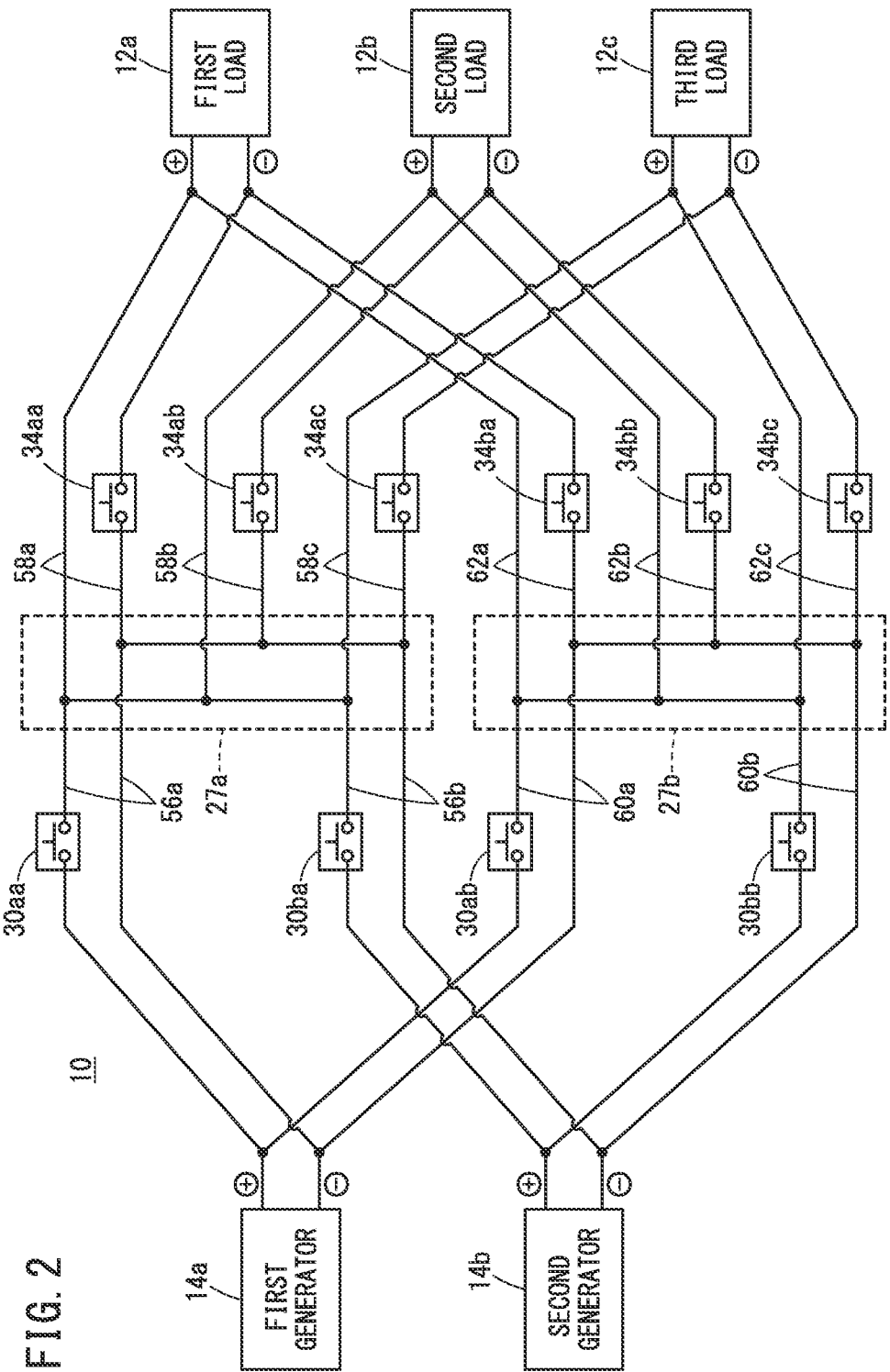
FIG. 2 is a diagram schematically showing a connection configuration of the power supply circuit.

FIG. 2 is a schematic diagram of the power supply circuit 10. FIG. 2 schematically shows connection among the first load 12a, the second load 12b, the third load 12c, the first generator 14a, the second generator 14b, the first power transmission bus 27a, the second power transmission bus 27b, the PCU switches 30aa, 30ab, 30ba, 30bb, and the power transmission bus switches 34aa, 34ab, 34ac, 34ba, 34bb, 34bc.

Hereinafter, the wiring between the first generator 14a and the first power transmission bus 27a will be referred to as a first power source conduction path 56a. The wiring between the second generator 14b and the first power transmission bus 27a is referred to as a first power source conduction path 56b. The wiring between the first power transmission bus 27a and the first load 12a is referred to as a first load conduction path 58a. The wiring between the first power transmission bus 27a and the second load 12b is referred to as a first load conduction path 58b. The wiring between the first power transmission bus 27a and the third load 12c is referred to as a first load conduction path 58c. The wiring between the second power transmission bus 27b and the first load 12a is referred to as a second load conduction path 62a. The wiring between the second power transmission bus 27b and the second load 12b is referred to as a second load conduction path 62b. The wiring between the second power transmission bus 27b and the third load 12c is referred to as a second load conduction path 62c.

As shown in FIG. 2, the PCU switch 30aa is provided in the positive wire of the first power source conduction path 56a. The PCU switch 30ba is provided in the positive wire of the first power source conduction path 56b. The power transmission bus switch 34aa is provided in the negative wire of the first load conduction path 58a. The power transmission bus switch 34ab is provided in the negative wire of the first load conduction path 58b. The power transmission bus switch 34ac is provided in the negative wire of the first load conduction path 58c.

As shown in FIG. 2, the PCU switch 30ab is provided in the positive wire of a second power source conduction path 60a. The PCU switch 30bb is provided in the positive wire of a second power source conduction path 60b. The power transmission bus switch 34ba is provided in the negative wire of the second load conduction path 62a. The power transmission bus switch 34bb is provided in the negative wire of the second load conduction path 62b. The power transmission bus switch 34bc is provided in the negative wire of the second load conduction path 62c.

Note that the PCU switch 30aa may be disposed in the negative wire of the first power source conduction path 56a, and the PCU switch 30ba may be disposed in the negative wire of the first power source conduction path 56b. In this case, the power transmission bus switch 34aa is disposed on the positive wire of the first load conduction path 58a, the power transmission bus switch 34ab is disposed on the positive wire of the first load conduction path 58b, and the power transmission bus switch 34ac is disposed on the positive wire of the first load conduction path 58c.

Further, the PCU switch 30ab may be disposed in the negative wire of the second power source conduction path 60a, and the PCU switch 30bb may be disposed in the negative wire of the second power source conduction path 60b. In this case, the power transmission bus switch 34ba is disposed on the positive wire of the second load conduction path 62a, the power transmission bus switch 34bb is disposed on the positive wire of the second load conductive path 62b, and the power transmission bus switch 34bc is disposed on the positive wire of the second load conduction path 62c.

The power supply circuit 10 of this embodiment is a circuit for supplying direct-current (DC) power to a load. However, the same arrangement as that of each switch of the power supply circuit 10 of the present embodiment can be applied to a circuit for supplying alternating-current (AC) power to a load.

[Operation of PCU Switches and Power Transmission Bus Switches]

Figure 3:
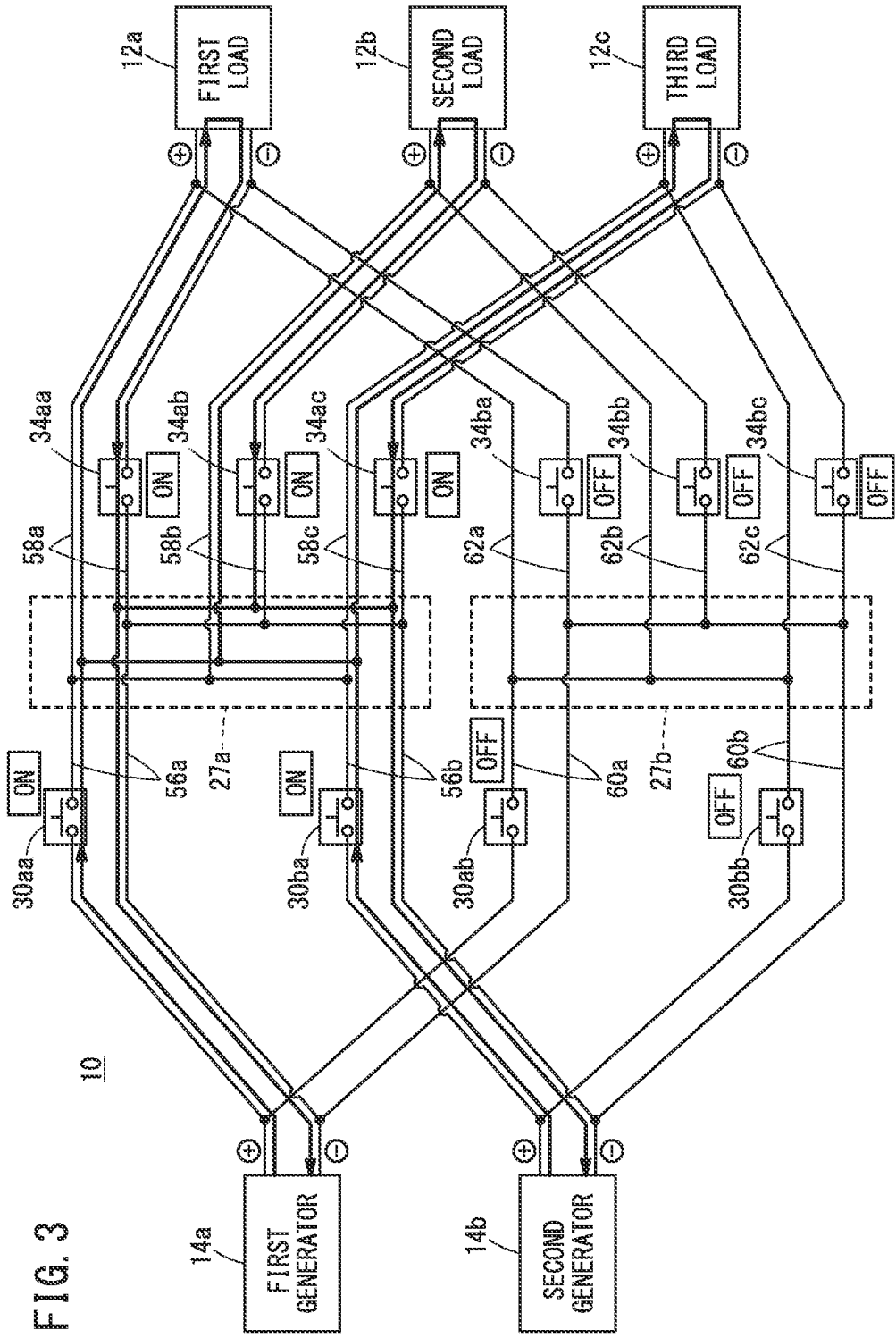
FIG. 3 is a diagram schematically showing a connection state of the power supply circuit.
Figure 4:
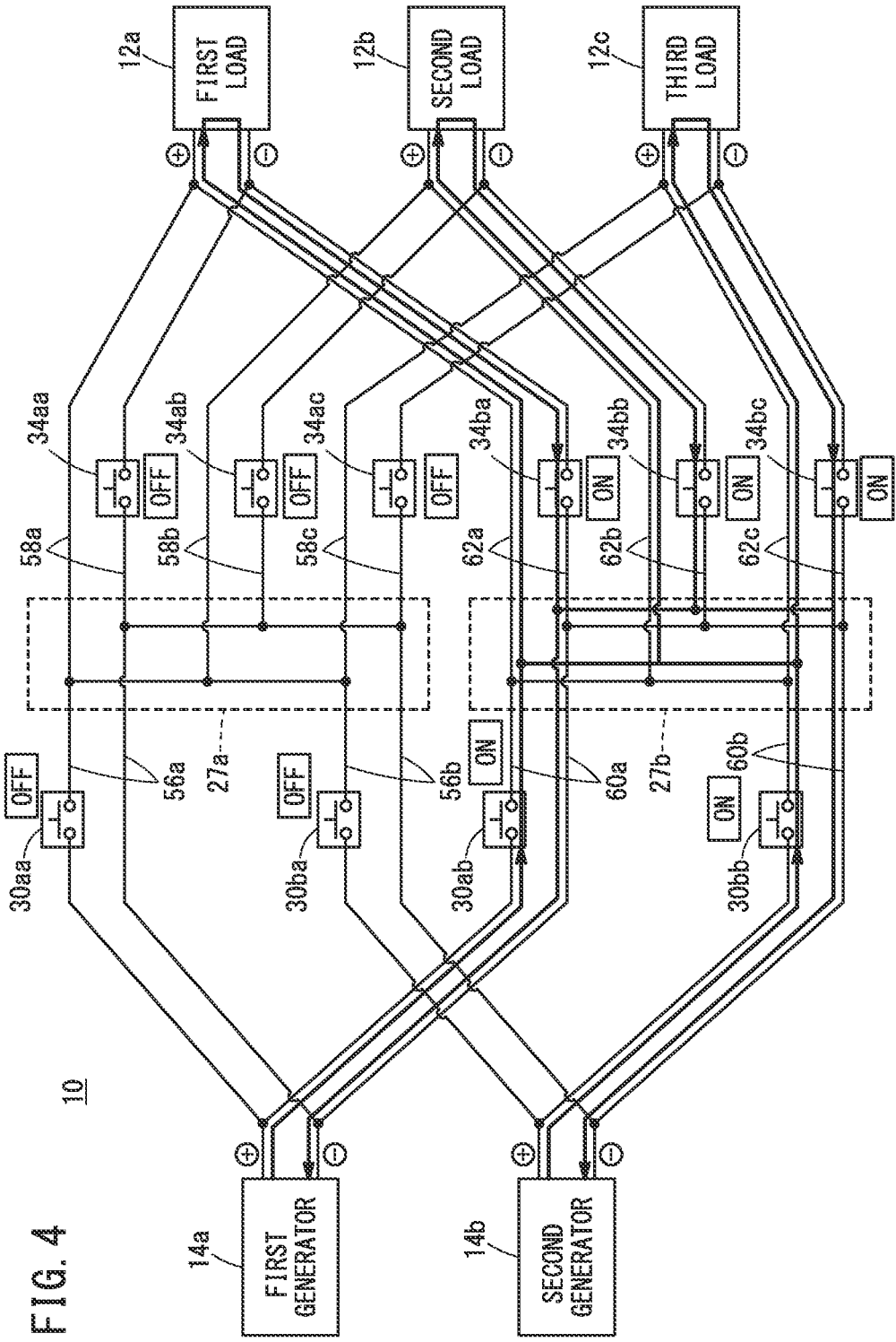
FIG. 4 is a diagram schematically showing a connection state of the power supply circuit.
Figure 5:
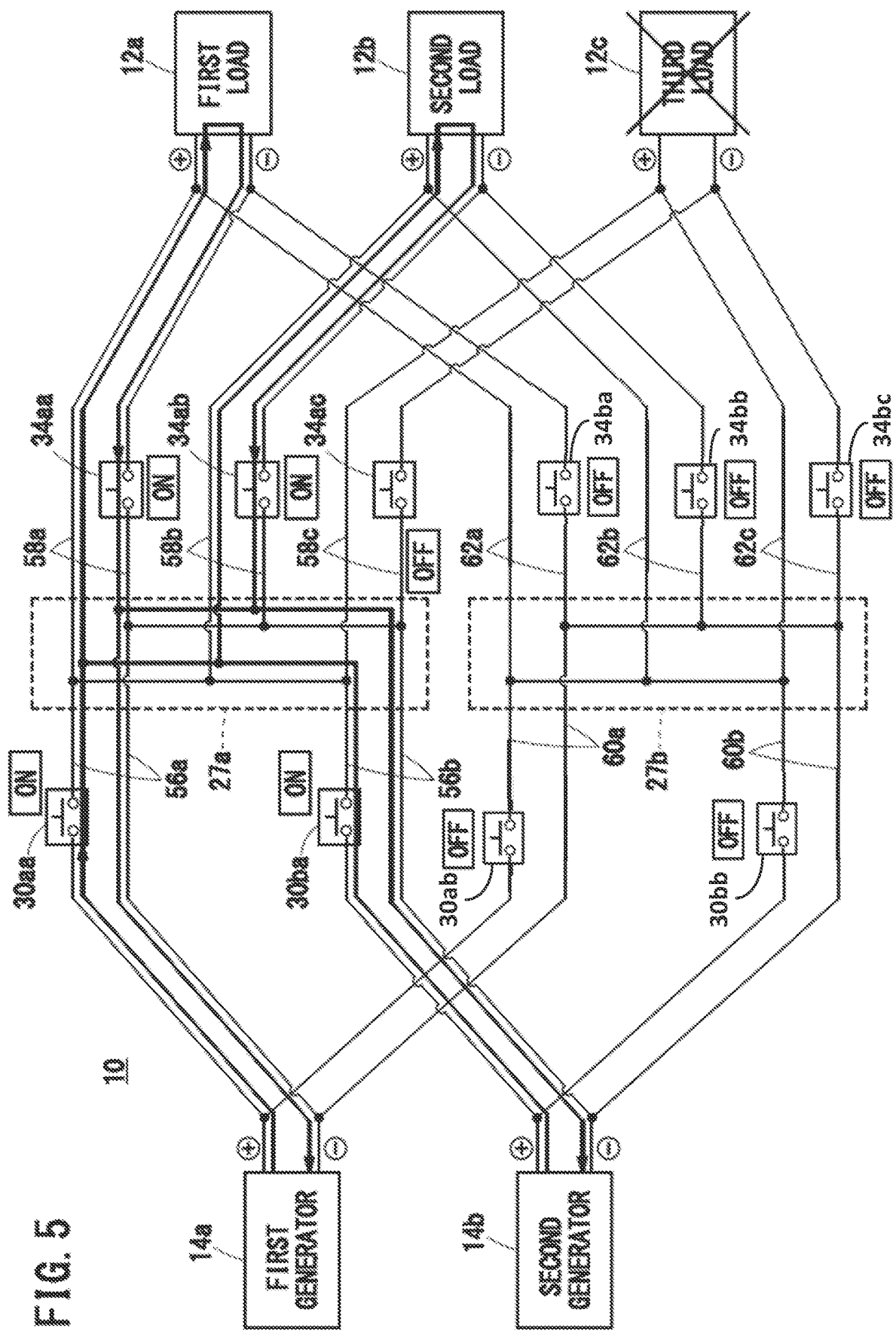
FIG. 5 is a diagram schematically showing a connection state of the power supply circuit.
Figure 6:
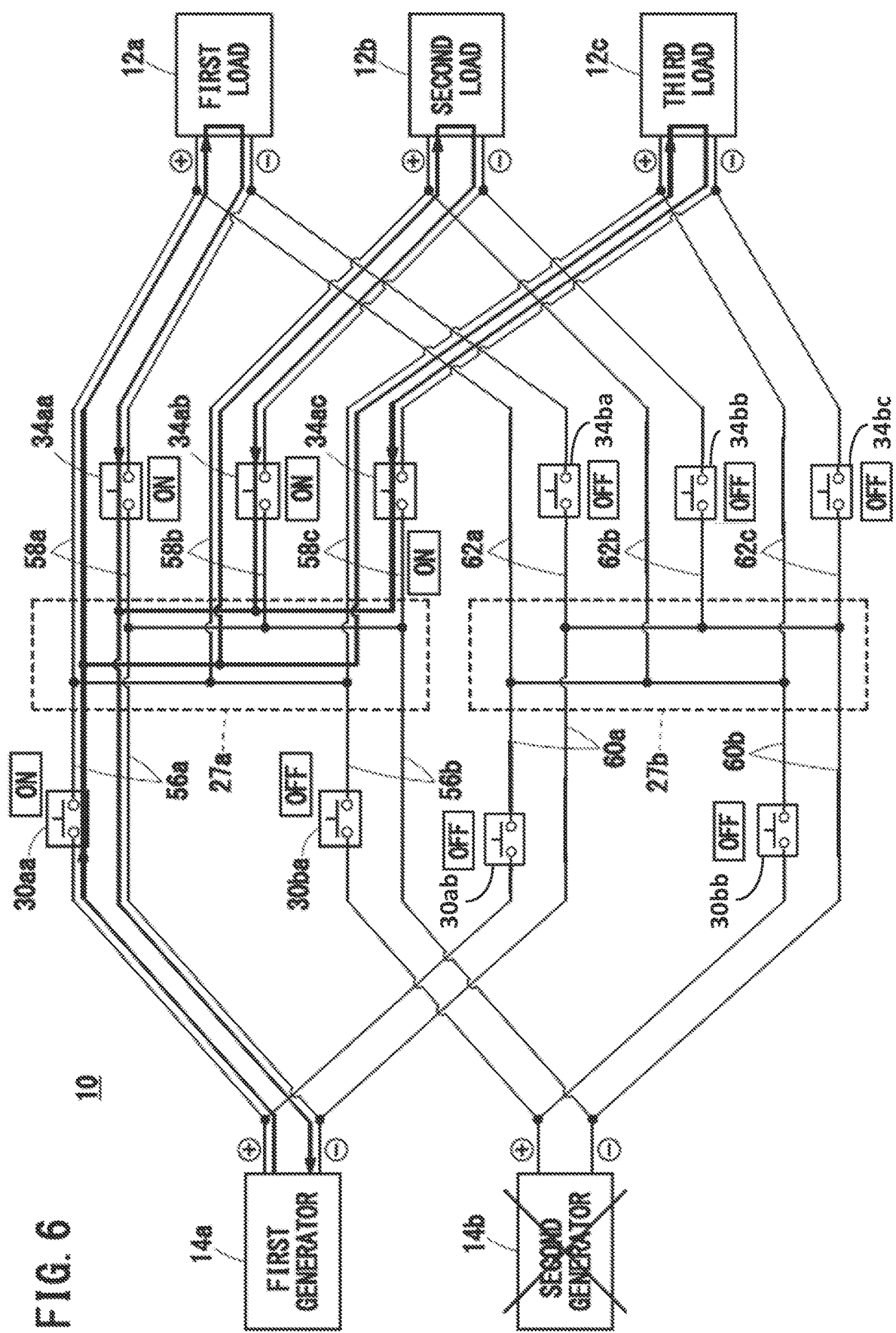
FIG. 6 is a diagram schematically showing a connection state of the power supply circuit.

FIGS. 3 to 6 are schematic views of FIG. 2 with the addition of an ON/OFF state of each switch and arrows indicating current flow. FIG. 3 shows an ON/OFF state of each switch and current flow in a normal state. FIG. 4 shows an ON/OFF state of each switch and current flow when an abnormality has occurred in the first power transmission bus 27a. FIG. 5 shows an ON/OFF state of each switch and a current flow when an abnormality has occurred in the third load 12c. FIG. 6 shows an ON/OFF state of each switch and current flow when an abnormality has occurred in the second generator 14b.

Normally, as shown in FIG. 3, the PCU switch 30aa and the PCU switch 30ba are turned on. The power transmission bus switch 34aa, the power transmission bus switch 34ab, and the power transmission bus switch 34ac are turned on. The PCU switch 30ab and the PCU switch 30bb are turned off. The power transmission bus switch 34ba, power transmission bus switch 34bb, and power transmission bus switch 34bc are turned off. Thus, power is supplied from the first generator 14a to each of the first load 12a, the second load 12b, and the third load 12c via the first power transmission bus 27a. Power is supplied from the second generator 14b to each of the first load 12a, the second load 12b, and the third load 12c via the first power transmission bus 27a. At this time, no current flows through the second power transmission bus 27b.

When an abnormality has occurred in the first power transmission bus 27a, as shown in FIG. 4, the PCU switches 30ab and 30bb are turned on. The power transmission bus switch 34ba, the power transmission bus switch 34bb and power transmission bus switch 34bc are turned on. The PCU switch 30aa and the PCU switch 30ba are turned off. The power transmission bus switch 34aa, the power transmission bus switch 34ab, and the power transmission bus switch 34ac are turned off. Thus, power is supplied from the first generator 14a to each of the first load 12a, the second load 12b, and the third load 12c via the second power transmission bus 27b. Power is supplied from the second generator 14b to each of the first load 12a, the second load 12b, and the third load 12c via the second power transmission bus 27b. At this time, no current flows through the first power transmission bus 27a.

It should be noted that the buses used for power supply may be switched between the first power transmission bus 27a and the second power transmission bus 27b regardless of whether or not an abnormality has occurred in the first power transmission bus 27a.

When an abnormality has occurred in the third load 12c, the PCU switch 30aa and the PCU switch 30ba are turned on as shown in FIG. 5. The power transmission bus switch 34aa and the power transmission bus switch 34ab are turned on. The PCU switch 30ab and the PCU switch 30bb are turned off. The power transmission bus switch 34ac, the power transmission bus switch 34ba, the power transmission bus switch 34bb, and the power transmission bus switch 34bc are turned off. Thus, the third load 12c is electrically separated from the first power transmission bus 27a and the second power transmission bus 27b.

When an abnormality has occurred in the second generator 14b, the PCU switch 30aa is turned on as shown in FIG. 6. The power transmission bus switch 34aa, the power transmission bus switch 34ab, and the power transmission bus switch 34ac are turned on. The PCU switches 30ab, 30ba, and 30bb are turned off. The power transmission bus switches 34ba, 34bb and 34bc are turned off. This electrically separates the second generator 14b from the first power transmission bus 27a and the second power transmission bus 27b.

Effects

Figure 7:
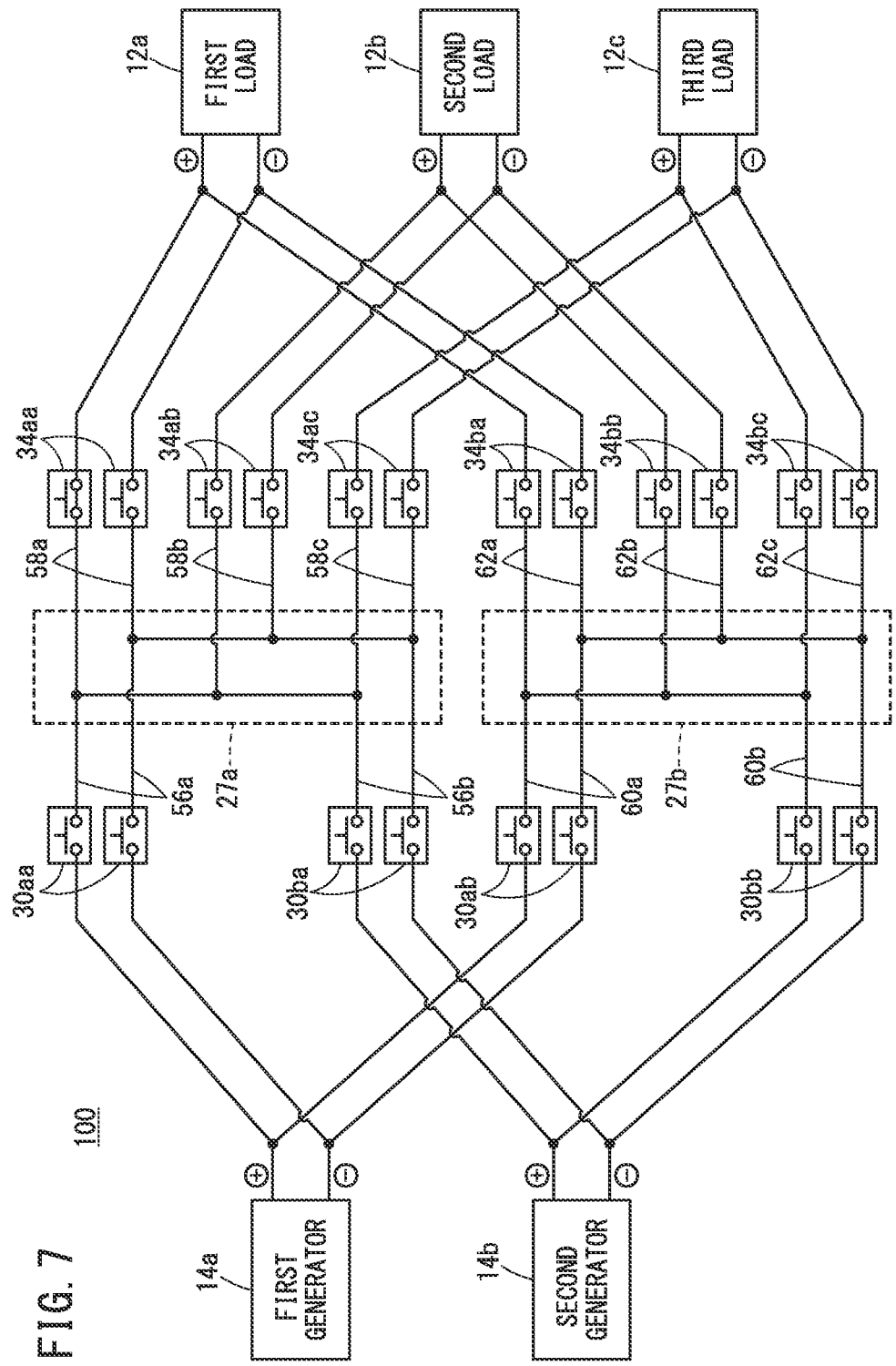
FIG. 7 is a diagram schematically showing a connection configuration of a power supply circuit.

FIG. 7 is a schematic view of a power supply circuit 100. FIG. 7 shows an example of the configuration of the PCU switches 30aa, 30ab, 30ba, 30bb and the power transmission bus switches 34aa, 34ab, 34ac, 34ba, 34bb, 34bc.

The power supply circuit 100 shown in FIG. 7 has a plurality of power transmission buses (a first power transmission bus 27a and a second power transmission bus 27b) for stable power supply. In normal operation, the power supply circuit 100 electrically disconnects the power sources (the first generator 14a and the second generator 14b) from the second power transmission bus 27b which is a backup power transmission bus. The power supply circuit 100 also electrically separates the loads (the first load 12a, the second load 12b, and the third load 12c) from the second power transmission bus 27b which is a backup power transmission bus. As a result, it is possible to prevent an abnormality occurring in the first power transmission bus 27a, which is a power transmission bus used in normal operation, from affecting the second power transmission bus 27b.

When an abnormality has occurred in the first power transmission bus 27a used in normal operation, the power supply circuit 100 electrically disconnects the power sources (the first generator 14a and the second generator 14b) from the first power transmission bus 27a. The power supply circuit 100 electrically separates the loads (the first load 12a, the second load 12b, and the third load 12c) from the first power transmission bus 27a. Thereafter, the power supply circuit 100 electrically connects the power sources (the first generator 14a and the second generator 14b) to the second power transmission bus 27b. The power supply circuit 100 electrically connects the loads (first load 12a, second load 12b, and third load 12c) to the second power transmission bus 27b. Thus, power is supplied from the power source to the load via the second power transmission bus 27b.

Further, when an abnormality has occurred in a power source or a load, the power supply circuit 100 electrically interrupts the power source in which the abnormality has occurred or the load in which the abnormality has occurred, from the first power transmission bus 27a.

As described above, in order to electrically connect the power sources and the loads to the power transmission buses and electrically disconnect the power sources and the loads from the power transmission buses, the configuration of the power supply circuit 100 as shown in FIG. 7 is conceivable. That is, as shown in FIG. 7, a PCU switch 30aa is provided in each of the positive wire and the negative wire of the first power source conduction path 56a. A PCU switch 30ba is provided in each of the positive wire and the negative wire of the first power source conduction path 56b. A PCU switch 30ab is provided in each of the positive wire and the negative wire of the second power source conduction path 60a. A PCU switch 30bb is provided in each of the positive wire and the negative wire of the second power source conduction path 60b.

Further, as shown in FIG. 7, a power transmission bus switch 34aa is provided in each of the positive wire and the negative wire of the first load conduction path 58a. A power transmission bus switch 34ab is provided in each of the positive wire and the negative wire of the first load conduction path 58b. A power transmission bus switch 34ac is provided in each of the positive wire and the negative wire of the first load conduction path 58c. A power transmission bus switch 34ba is provided in each of the positive wire and the negative wire of the second load conduction path 62a. A power transmission bus switch 34bb is provided in each of the positive wire and the negative wire of the second load conduction path 62b. A power transmission bus switch 34bc is provided in each of the positive wire and the negative wire of the second load conduction path 62c.

Thus, the power supply circuit 100 shown in FIG. 7 can electrically connect each of the first generator 14a, the second generator 14b, the first load 12a, the second load 12b, and the third load 12c to each of the first power transmission bus 27a and the second power transmission bus 27b. The power supply circuit 100 shown in FIG. 7 can electrically separate each of the first generator 14a, the second generator 14b, the first load 12a, the second load 12b, and the third load 12c from each of the first power transmission bus 27a and the second power transmission bus 27b. However, in the power supply circuit 100 shown in FIG. 7, since a large number of switches are provided, the power supply circuit 100 becomes heavy in weight, large in size, and expensive.

Therefore, in the power supply circuit 10 of the present embodiment, the PCU switch 30aa is provided only in the positive wire of the first power source conduction path 56a. The PCU switch 30ba is provided only in the positive wire of the first power source conduction path 56b. The PCU switch 30ab is provided only in the positive wire of the second power source conduction path 60a. The PCU switch 30bb is provided only in the positive wire of the second power source conduction path 60b.

Further, in the power supply circuit 10 of the present embodiment, the power transmission bus switch 34aa is provided only in the negative wire of the first load conduction path 58a. The power transmission bus switch 34ab is provided only in the negative wire of the first load conduction path 58b. The power transmission bus switch 34ac is provided only in the negative wire of the first load conduction path 58c. The power transmission bus switch 34ba is provided only in the negative wire of the second load conduction path 62a. The power transmission bus switch 34bb is provided only in the negative wire of the second load conduction path 62b. The power transmission bus switch 34bc is provided only in the negative wire of the second load conduction path 62c.

Thus, the power supply circuit 10 of this embodiment can electrically connect each of the first generator 14a, the second generator 14b, the first load 12a, the second load 12b, and the third load 12c to each of the first power transmission bus 27a and the second power transmission bus 27b. Further, the power supply circuit 10 of this embodiment can electrically separate each of the first generator 14a, the second generator 14b, the first load 12a, the second load 12b, and the third load 12c from each of the first power transmission bus 27a and the second power transmission bus 27b.

In the power supply circuit 100 of the example shown in FIG. 7, the number of switches (PCU switches 30aa, 30ab, 30ba, 30bb and power transmission bus switches 34aa, 34ab, 34ac, 34ba, 34bb, 34bc) is 20. On the other hand, in the power supply circuit 10 of the present embodiment shown in FIG. 2, the number of switches (PCU switches 30aa, 30ab, 30ba, 30bb and power transmission bus switches 34aa, 34ab, 34ac, 34ba, 34bb, 34bc) is 10. Therefore, the power supply circuit 10 can be reduced in weight, size, and cost.

In the power supply circuit 10 of the present embodiment, the PCU switch 30aa is provided on the positive wire of the first power source conduction path 56a. The PCU switch 30ba is provided on the positive wire of the first power source conduction path 56b. Further, the PCU switch 30ab is provided on the positive wire of the second power source conduction path 60a. The PCU switch 30bb is provided on the positive wire of the second power source conduction path 60b. Thus, for each of the first power source conduction path 56a, the first power source conduction path 56b, the second power source conduction path 60a, and the second power source conduction path 60b, similar parts (PCU switch 30aa, PCU switch 30ba, PCU switch 30ab, and PCU switch 30bb) are provided on similar wires (positive wires). Therefore, the cost of the power supply circuit 10 can be reduced.

Further, in the power supply circuit 10 of the present embodiment, the power transmission bus switch 34aa, the power transmission bus switch 34ab, and the power transmission bus switch 34ac are provided in the negative wires of the first load conduction path 58a, the first load conduction path 58b, and the first load conduction path 58c, respectively. The power transmission bus switch 34ba, the power transmission bus switch 34bb, and the power transmission bus switch 34bc are provided in the negative wires of the second load conduction path 62a, the second load conduction path 62b, and the second load conduction path 62c, respectively. Thus, the components constituting the first load conduction path 58a, the first load conduction path 58b, and the first load conduction path 58c can be made the same as the components constituting the second load conduction path 62a, the second load conduction path 62b, and the second load conduction path 62c. Therefore, the cost of the power supply circuit 10 can be reduced.

Second Embodiment

FIG. 8 is a schematic diagram of the power supply circuit 10. FIG. 8 schematically shows connection among the first load 12a, the second load 12b, the third load 12c, the first generator 14a, the second generator 14b, the first power transmission bus 27a, the second power transmission bus 27b, the PCU switches 30aa, 30ab, 30ba, 30bb, and the power transmission bus switches 34aa, 34ab, 34ac, 34ba, 34bb, 34bc. The power supply circuit 10 of this embodiment differs from the power supply circuit 10 of the first embodiment in the arrangement of the PCU switch 30aa, the PCU switch 30ab, the PCU switch 30ba, the PCU switch 30bb, the power transmission bus switch 34aa, the power transmission bus switch 34ab, the power transmission bus switch 34ac, the power transmission bus switch 34ba, the power transmission bus switch 34bb, and the power transmission bus switch 34bc.

The PCU switch 30aa and the PCU switch 30ba correspond to the first positive electrode switch of the present invention. The PCU switch 30ab and the PCU switch 30bb correspond to the second negative electrode switch of the present invention. The power transmission bus switch 34aa, the power transmission bus switch 34ab, and the power transmission bus switch 34ac correspond to the first negative electrode switch of the present invention. The power transmission bus switch 34ba, the power transmission bus switch 34bb, and the power transmission bus switch 34bc correspond to the second positive electrode switch of the present invention.

As shown in FIG. 8, the PCU switch 30aa is provided in the positive wire of the first power source conduction path 56a, and the PCU switch 30ba is provided in the positive wire of the first power source conduction path 56b. On the other hand, the PCU switch 30ab is provided in the negative wire of the second power source conduction path 60a, and the PCU switch 30bb is provided in the negative wire of the second power source conduction path 60b. That is, the PCU switch 30aa and the PCU switch 30ba are provided in the respective positive wires of the first power source conduction path 56a and the first power source conduction path 56b. On the other hand, the PCU switch 30ab and the PCU switch 30bb are provided in the respective negative wires of the second power source conduction path 60a and the second power source conduction path 60b.

As shown in FIG. 8, the power transmission bus switch 34aa is provided in the negative wire of the first load conduction path 58a. The power transmission bus switch 34ab is provided in the negative wire of the first load conduction path 58b. The power transmission bus switch 34ac is provided in the negative wire of the first load conduction path 58c. On the other hand, the power transmission bus switch 34ba is provided in the positive wire of the second load conduction path 62a. The power transmission bus switch 34bb is provided in the positive wire of the second load conduction path 62b. The power transmission bus switch 34bc is provided in the positive wire of the second load conduction path 62c. That is, the power transmission bus switch 34aa, the power transmission bus switch 34ab, and the power transmission bus switch 34ac are provided in the respective negative wires of the first load conduction path 58a, the first load conduction path 58b, and the first load conduction path 58c. On the other hand, the power transmission bus switch 34ba, the power transmission bus switch 34bb, and the power transmission bus switch 34bc are provided in the respective positive wires of the second load conduction path 62a, the second load conduction path 62b, and the second load conduction path 62c.

Effects

In the power supply circuit 10 of the present embodiment, the PCU switch 30aa and the PCU switch 30ba are provided respectively in the positive wire of the first power source conduction path 56a and the positive wire of the first power source conduction path 56b. On the other hand, the PCU switch 30ab and the PCU switch 30bb are provided respectively in the negative wire of the second power source conduction path 60a and the negative wire of the second power source conduction path 60b. Moreover, the power transmission bus switch 34aa, the power transmission bus switch 34ab, and the power transmission bus switch 34ac are provided respectively in the negative wire of the first load conduction path 58a, the negative wire of the first load conduction path 58b, and the negative wire of the first load conduction path 58c. On the other hand, the power transmission bus switch 34ba, the power transmission bus switch 34bb, and the power transmission bus switch 34bc are provided respectively in the positive wire of the second load conduction path 62a, the positive wire of the second load conduction path 62b, and the positive wire of the second load conduction path 62c. This can prevent uneven weight distribution of the power supply circuit 10.

Technical Invention Obtained from Embodiments

Technical inventions that can be understood from the above embodiments will be described below.

A power supply circuit (10) includes: a first power source conduction path (56a, 56b) provided between a power source (14a, 14b) and a first power transmission bus (27a); a first load conduction path (58a, 58b, 58c) provided between the first power transmission bus and a load (12a, 12b, 12c); a second power source conduction path (60a, 60b) provided between the power source and a second power transmission bus (27b); and a second load conduction path (62a, 62b, 62c) provided between the second power transmission bus and the load. The power supply circuit (10) further includes: a first positive electrode switch (30aa, 30ba) provided in a positive wire of one of the first power source conduction path or the first load conduction path, the first positive electrode switch being configured to switch between an electrically connected state and an electrically disconnected state of the power source and the first power transmission bus or of the first power transmission bus and the load; a first negative electrode switch (34aa, 34ab, 34ac) provided in a negative wire of another of the first power source conduction path or the first load conduction path, the first negative electrode switch being configured to switch between an electrically connected state and an electrically disconnected state of the power source and the first power transmission bus or of the first power transmission bus and the load; a second positive electrode switch (30ab, 30bb) provided in a positive wire of one of the second power source conduction path or the second load conduction path, the second positive electrode switch being configured to switch between an electrically connected state and an electrically disconnected state of the power source and the second power transmission bus or of the second power transmission bus and the load; and a second negative electrode switch (34ba, 34bb, 34bc) provided in a negative wire of another of the second power source conduction path or the second load conduction path, the second negative electrode switch being configured to switch between an electrically connected state and an electrically disconnected state of the power source and the second power transmission bus or of the second power transmission bus and the load.

In the power supply circuit, the first positive electrode switch may be provided in the positive wire of the first power source conduction path; the first negative electrode switch may be provided in the negative wire of the first load conduction path; the second positive electrode switch may be provided in the positive wire of the second power source conduction path; and the second negative electrode switch may be provided in the negative wire of the second load conduction path.

In the power supply circuit, the first positive electrode switch may be provided in the positive wire of the first power source conduction path; the first negative electrode switch may be provided in the negative wire of the first load conduction path; the second positive electrode switch may be provided in the positive wire of the second load conduction path; and the second negative electrode switch may be provided in the negative wire of the second power source conduction path.

In the power supply circuit described above, the power source may include a plurality of power sources; the first power source conduction path may be provided between each of the power sources and the first power transmission bus; the first power transmission bus may connect the plurality of power sources in parallel; the second power source conduction path may be provided between each of the power sources and the second power transmission bus; and the second power transmission bus may connect the plurality of power sources in parallel.

In the power supply circuit, the load may include a plurality of loads; the first load conduction path may be provided between the first power transmission bus and each of the loads; the first power transmission bus may connect the plurality of loads in parallel; the second load conduction path may be provided between the second power transmission bus and each of the loads; and the second power transmission bus may connect the plurality of loads in parallel.

The present invention is not particularly limited to the embodiment described above, and various modifications are possible without departing from the essence and gist of the present invention.

What is claimed is:

1. A power supply circuit comprising:
a first power source conduction path provided between a power source and a first power transmission bus;
a first load conduction path provided between the first power transmission bus and a load;
a second power source conduction path provided between the power source and a second power transmission bus; and
a second load conduction path provided between the second power transmission bus and the load,
wherein the power supply circuit further comprises:
a first positive electrode switch and provided in a positive wire of one of the first power source conduction path or the first load conduction path, the first positive electrode switch being configured to switch between an electrically connected state and an electrically disconnected state of the power source and the first power transmission bus or of the first power transmission bus and the load;
a first negative electrode switch provided in a negative wire of the other of the first power source conduction path or the first load conduction path at which the first positive electrode switch is not provided, the first negative electrode switch being configured to switch between an electrically connected state and an electrically disconnected state of the power source and the first power transmission bus or of the first power transmission bus and the load;
a second positive electrode switch provided in a positive wire of one of the second power source conduction path or the second load conduction path, the second positive electrode switch being configured to switch between an electrically connected state and an electrically disconnected state of the power source and the second power transmission bus or of the second power transmission bus and the load; and
a second negative electrode switch and provided in a negative wire of the other of the second power source conduction path or the second load conduction path at which the second positive electrode switch is not provided, the second negative electrode switch being configured to switch between an electrically connected state and an electrically disconnected state of the power source and the second power transmission bus or of the second power transmission bus and the load.

2. The power supply circuit according to claim 1, wherein:
the power source comprises a plurality of power sources;
the first power source conduction path is provided between each of the power sources and the first power transmission bus;
the first power transmission bus connects the plurality of power sources in parallel;
the second power source conduction path is provided between each of the power sources and the second power transmission bus; and
the second power transmission bus connects the plurality of power sources in parallel.

3. The power supply circuit according to claim 1, wherein:
the load comprises a plurality of loads;
the first load conduction path is provided between the first power transmission bus and each of the loads;
the first power transmission bus connects the plurality of loads in parallel;
the second load conduction path is provided between the second power transmission bus and each of the loads; and
the second power transmission bus connects the plurality of loads in parallel.

4. A power supply circuit comprising:
a first power source conduction path provided between a power source and a first power transmission bus;
a first load conduction path provided between the first power transmission bus and a load;
a second power source conduction path provided between the power source and a second power transmission bus; and
a second load conduction path provided between the second power transmission bus and the load,
wherein the power supply circuit further comprises:
a first positive electrode switch and provided in a positive wire of one of the first power source conduction path or the first load conduction path, the first positive electrode switch being configured to switch between an electrically connected state and an electrically disconnected state of the power source and the first power transmission bus or of the first power transmission bus and the load;
a first negative electrode switch provided in a negative wire of the other of the first power source conduction path or the first load conduction path at which the first positive electrode switch is not provided, the first negative electrode switch being configured to switch between an electrically connected state and an electrically disconnected state of the power source and the first power transmission bus or of the first power transmission bus and the load;
a second positive electrode switch provided in a positive wire of one of the second power source conduction path or the second load conduction path, the second positive electrode switch being configured to switch between an electrically connected state and an electrically disconnected state of the power source and the second power transmission bus or of the second power transmission bus and the load; and
a second negative electrode switch and provided in a negative wire of the other of the second power source conduction path or the second load conduction path at which the second positive electrode switch is not provided, the second negative electrode switch being configured to switch between an electrically connected state and an electrically disconnected state of the power source and the second power transmission bus or of the second power transmission bus and the load;
wherein:
the first positive electrode switch is provided in the positive wire of the first power source conduction path;
the first negative electrode switch is provided in the negative wire of the first load conduction path;

the second positive electrode switch is provided in the positive wire of the second power source conduction path; and the second negative electrode switch is provided in the negative wire of the second load conduction path.

5. The power supply circuit according to claim 4, wherein:

the power source comprises a plurality of power sources;

the first power source conduction path is provided between each of the power sources and the first power transmission bus;

the first power transmission bus connects the plurality of power sources in parallel;

the second power source conduction path is provided between each of the power sources and the second power transmission bus; and the second power transmission bus connects the plurality of power sources in parallel.

6. The power supply circuit according to claim 4, wherein:

the load comprises a plurality of loads;

the first load conduction path is provided between the first power transmission bus and each of the loads;

the first power transmission bus connects the plurality of loads in parallel;

the second load conduction path is provided between the second power transmission bus and each of the loads; and the second power transmission bus connects the plurality of loads in parallel.

7. A power supply circuit comprising:

a first power source conduction path provided between a power source and a first power transmission bus;

a first load conduction path provided between the first power transmission bus and a load;

a second power source conduction path provided between the power source and a second power transmission bus; and a second load conduction path provided between the second power transmission bus and the load, wherein the power supply circuit further comprises:

a first positive electrode switch and provided in a positive wire of one of the first power source conduction path or the first load conduction path, the first positive electrode switch being configured to switch between an electrically connected state and an electrically disconnected state of the power source and the first power transmission bus or of the first power transmission bus and the load;

a first negative electrode switch provided in a negative wire of the other of the first power source conduction path or the first load conduction path at which the first positive electrode switch is not provided, the first negative electrode switch being configured to switch between an electrically connected state and an electrically disconnected state of the power source and the first power transmission bus or of the first power transmission bus and the load;

a second positive electrode switch provided in a positive wire of one of the second power source conduction path or the second load conduction path, the second positive electrode switch being configured to switch between an electrically connected state and an electrically disconnected state of the power source and the second power transmission bus or of the second power transmission bus and the load; and a second negative electrode switch and provided in a negative wire of the other of the second power source conduction path or the second load conduction path at which the second positive electrode switch is not provided, the second negative electrode switch being configured to switch between an electrically connected state and an electrically disconnected state of the power source and the second power transmission bus or of the second power transmission bus and the load;

wherein:

the first positive electrode switch is provided in the positive wire of the first power source conduction path;

the first negative electrode switch is provided in the negative wire of the first load conduction path;

the second positive electrode switch is provided in the positive wire of the second load conduction path; and the second negative electrode switch is provided in the negative wire of the second power source conduction path.

8. The power supply circuit according to claim 7, wherein:

the power source comprises a plurality of power sources;

the first power source conduction path is provided between each of the power sources and the first power transmission bus;

the first power transmission bus connects the plurality of power sources in parallel;

the second power source conduction path is provided between each of the power sources and the second power transmission bus; and the second power transmission bus connects the plurality of power sources in parallel.

9. The power supply circuit according to claim 7, wherein:

the load comprises a plurality of loads;

the first load conduction path is provided between the first power transmission bus and each of the loads;

the first power transmission bus connects the plurality of loads in parallel;

the second load conduction path is provided between the second power transmission bus and each of the loads; and the second power transmission bus connects the plurality of loads in parallel.

\* \* \* \* \*